(12) United States Patent
Cook et al.

(10) Patent No.: US 11,607,704 B2
(45) Date of Patent: Mar. 21, 2023

(54) METHODS AND APPARATUS FOR ELECTROSTATIC CONTROL OF EXPELLED MATERIAL FOR LENS CLEANERS

(71) Applicant: TEXAS INSTRUMENTS INCORPORATED, Dallas, TX (US)

(72) Inventors: Benjamin Stassen Cook, Addison, TX (US); Daniel Lee Revier, Addison, TX (US); Stephen John Fedigan, Plano, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/492,395

(22) Filed: Apr. 20, 2017

(65) Prior Publication Data
US 2018/0304282 A1 Oct. 25, 2018

(51) Int. Cl.
| | | |
|---|---|---|
| *B05B 17/06* | (2006.01) | |
| *B05B 5/08* | (2006.01) | |
| *G02B 1/18* | (2015.01) | |
| *G02B 27/00* | (2006.01) | |

(52) U.S. Cl.
CPC .......... *B05B 17/0669* (2013.01); *B05B 5/087* (2013.01); *G02B 1/18* (2015.01); *G02B 27/0006* (2013.01); *B05B 17/0661* (2013.01)

(58) Field of Classification Search
CPC . B05B 5/002; B05B 17/0661; B05B 17/0669; B60S 1/56

USPC ....................... 239/3; 137/560; 359/507–514
See application file for complete search history.

(56) References Cited

U.S. PATENT DOCUMENTS

| | | | |
|---|---|---|---|
| 3,681,626 A | 8/1972 | Puskas | |
| 4,019,073 A | 4/1977 | Vishnevsky et al. | |
| 4,271,371 A | 6/1981 | Furuichi et al. | |
| 4,556,467 A * | 12/1985 | Kuhn | ....................... B01J 19/10 134/1 |
| 4,607,652 A | 8/1986 | Yung | |
| 4,654,554 A | 3/1987 | Kishi | |

(Continued)

FOREIGN PATENT DOCUMENTS

| | | |
|---|---|---|
| CN | 1821536 A | 8/2006 |
| CN | 101063830 A | 10/2007 |

(Continued)

OTHER PUBLICATIONS

Graff, "Wave Motion in Elastic Solids", Dover, 1991 (3 pages).

(Continued)

*Primary Examiner* — Chee-Chong Lee
(74) *Attorney, Agent, or Firm* — Frank D. Cimino

(57) ABSTRACT

Methods and apparatus for electrostatic control of expelled material for lens cleaners are disclosed. In certain described examples, an apparatus can expel fluid by atomization from a central area of the surface using an ultrasonic transducer mechanically coupled to the surface. A first electrode can be arranged relative to the central area of the surface. A second electrode can be located in a peripheral area relative to the central area of the surface, in which a voltage can be applied between the first and second electrodes to attract atomized fluid at the peripheral area.

23 Claims, 6 Drawing Sheets

(56) References Cited

U.S. PATENT DOCUMENTS

| | | | |
|---|---|---|---|
| 4,691,725 A * | 9/1987 | Parisi | A45C 11/005 |
| | | | 134/1 |
| 4,710,233 A * | 12/1987 | Hohmann | A61L 2/035 |
| | | | 205/701 |
| 4,836,684 A * | 6/1989 | Javorik | B08B 3/12 |
| | | | 134/1 |
| 4,852,592 A * | 8/1989 | DiGangi | A61L 12/086 |
| | | | 134/113 |
| 4,870,982 A * | 10/1989 | Liu | A47L 25/00 |
| | | | 134/1 |
| 5,005,015 A | 4/1991 | Dehn et al. | |
| 5,037,189 A | 8/1991 | Fujie et al. | |
| 5,071,776 A * | 12/1991 | Matsushita | H01L 21/02008 |
| | | | 134/1 |
| 5,113,116 A | 5/1992 | Wilson | |
| 5,155,625 A | 10/1992 | Komatsu et al. | |
| 5,178,173 A | 1/1993 | Erickson et al. | |
| 5,313,333 A | 5/1994 | O'Brien et al. | |
| 5,706,840 A | 1/1998 | Schneider et al. | |
| 5,853,500 A | 12/1998 | Joshi et al. | |
| 6,064,259 A | 5/2000 | Takita | |
| 6,607,606 B2 | 8/2003 | Bronson | |
| 6,764,168 B1 | 7/2004 | Meinhold et al. | |
| 6,880,402 B1 | 4/2005 | Couet et al. | |
| 7,215,372 B2 | 5/2007 | Ito et al. | |
| 7,705,517 B1 | 4/2010 | Koen et al. | |
| 8,286,801 B2 | 10/2012 | Youngs | |
| 8,293,026 B1 | 10/2012 | Bodor et al. | |
| 8,337,760 B2 | 12/2012 | Wolters | |
| 8,494,200 B2 | 7/2013 | Ram | |
| 8,899,761 B2 | 12/2014 | Tonar et al. | |
| 9,070,856 B1 | 6/2015 | Rose et al. | |
| 9,080,961 B2 | 7/2015 | Adachi | |
| 9,084,053 B2 | 7/2015 | Parkins | |
| 9,095,882 B2 | 8/2015 | Shimada | |
| 9,226,076 B2 | 12/2015 | Lippert et al. | |
| 9,253,297 B2 | 2/2016 | Abe et al. | |
| 9,573,165 B2 | 2/2017 | Weber | |
| 9,796,359 B2 | 10/2017 | Field et al. | |
| 10,384,239 B2 | 8/2019 | Fedigan et al. | |
| 10,596,604 B2 | 3/2020 | Fedigan et al. | |
| 2002/0139394 A1 | 10/2002 | Bronson | |
| 2003/0214599 A1 | 11/2003 | Ito et al. | |
| 2006/0285108 A1 | 12/2006 | Morrisroe | |
| 2007/0046143 A1 | 3/2007 | Blandino | |
| 2007/0103554 A1 | 5/2007 | Kaihara et al. | |
| 2007/0159422 A1 | 7/2007 | Blandino | |
| 2008/0198458 A1 | 8/2008 | Kashiyama | |
| 2008/0248416 A1 | 10/2008 | Norikane | |
| 2010/0165170 A1 | 7/2010 | Kawai et al. | |
| 2010/0171872 A1 | 7/2010 | Okano | |
| 2011/0073142 A1 | 3/2011 | Hattori et al. | |
| 2011/0228389 A1 | 9/2011 | Ohashi | |
| 2012/0224309 A1 | 9/2012 | Ikeda et al. | |
| 2012/0243093 A1 | 9/2012 | Tonar | |
| 2013/0170685 A1 | 7/2013 | Oh | |
| 2013/0242481 A1 | 9/2013 | Kim | |
| 2013/0333978 A1 | 12/2013 | Abe | |
| 2014/0033454 A1 | 2/2014 | Koops et al. | |
| 2014/0218877 A1 | 8/2014 | Wei | |
| 2014/0253150 A1 | 9/2014 | Menzel | |
| 2015/0277100 A1 | 10/2015 | Novoselov | |
| 2016/0178898 A1 | 6/2016 | Eineren et al. | |
| 2016/0266379 A1 | 9/2016 | Li et al. | |
| 2017/0361360 A1 | 12/2017 | Li et al. | |
| 2018/0085784 A1 | 3/2018 | Fedigan | |
| 2018/0085793 A1 | 3/2018 | Fedigan | |
| 2018/0117642 A1 | 5/2018 | Magee et al. | |
| 2018/0239218 A1 | 8/2018 | Ikeuchi | |
| 2018/0264526 A1 | 9/2018 | Kim | |
| 2018/0275397 A1 * | 9/2018 | Chung | G02B 27/0006 |
| 2018/0304282 A1 | 10/2018 | Cook | |
| 2018/0304318 A1 | 10/2018 | Revier | |
| 2018/0326462 A1 | 11/2018 | Revier | |
| 2019/0277787 A1 | 9/2019 | Chung et al. | |

FOREIGN PATENT DOCUMENTS

| | | | | |
|---|---|---|---|---|
| CN | 101274326 A | 10/2008 | | |
| CN | 201223863 Y | 4/2009 | | |
| CN | 201579230 U | 9/2010 | | |
| CN | 1903455 A | 12/2012 | | |
| CN | 103191886 A | 7/2013 | | |
| CN | 103312948 A | 9/2013 | | |
| CN | 103376612 A | 10/2013 | | |
| CN | 103775869 A | 5/2014 | | |
| CN | 103286097 A | 10/2017 | | |
| DE | 10114230 A1 | 10/2001 | | |
| DE | 102012214650 | 2/2014 | | |
| EP | 1703062 | 9/2006 | | |
| EP | 2479595 | 7/2012 | | |
| EP | 2777579 B1 | 4/2015 | | |
| EP | 2873572 A1 | 5/2015 | | |
| JP | 2009283069 A | 12/2009 | | |
| JP | 5608688 A | 10/2014 | | |
| KR | 20130076250 A | 7/2013 | | |
| KR | 101851435 B1 * | 4/2018 | | G02B 27/0006 |
| WO | 2007005852 A2 | 1/2007 | | |
| WO | 2010104867 A1 | 9/2010 | | |
| WO | 2016167110 A1 | 2/2018 | | |
| WO | 2018207041 | 11/2018 | | |

OTHER PUBLICATIONS

Hagedorn et al., "Travelling Wave Ultrasonic Motors, Part I: Working Principle and Mathematical Modelling of the Stator", Journal of Sound and Vibration, 1992, 155(1), pp. 31-46.

U.S. Appl. No. 15/492,433, entitled "Methods and Apparatus for Surface Wetting Control," filed Apr. 20, 2017 (46 pages).

U.S. Appl. No. 15/492,286, entitled "Methods and Apparatus Using Multistage Ultrasonic Lens Cleaning for Improved Water Removal," filed Apr. 20, 2017 (62 pages).

U.S. Appl. No. 15/492,315, entitled "Methods and Apparatus for Ultrasonic Lens Cleaner Using Configurable Filter Banks," filed Apr. 20, 2017 (63 pages).

Howard, "High speed photography of ultrasonic atomization," Thesis, Brown University, May 13, 2010, 39 pages.

Ziaei-Moayyed et al., "Electrical Deflection of Polar Liquid Streams: A Misunderstood Demonstration," Journal of Chemical Education, vol. 77, No. 11, Nov. 2000, 4 pages.

International Search Report for PCT/US2017/059536 dated Feb. 28, 2018.

Vaseiljev, "Ultrasonic system for solar panel cleaning", Sensors and Actuators A, vol. 200, Oct. 1, 2013, pp. 74-78.

Kazemi, "Substrate cleaning using ultrasonics/megasonics," 2011 IEEE/SEMI Advanced Semiconductor Manufacturing Conference, Saratoga Springs, NY, 2011, pp. 1-6.

Brereton, "Particle Removal by Focused Ultrasound", Journal of Sound and Vibration vol. 173, Issue 5, Jun. 23, 1994, pp. 683-698.

Gale, "Removal of Particulate Contaminants using Ultrasonics and Megasonics: A Review", Particulate Science and Technology, 1994, 13:3-4, 197-211.

Lee, "Smart self-cleaning cover glass for automotive miniature cameras," 2016 IEEE 29th International Conference on Micro Electra Mechanical Systems (MEMS), Shanghai, 2016, pp. 83-86.

International Search Report for PCT/US2017/084530 dated Apr. 5, 2018.

International Search Report for PCT Application No. PCT/US2018/016714, dated Jun. 21, 2018 (2 pages).

Extended European Search Report for 17866470.2 dated Oct. 8, 2019.

Extended European Search Report for 17878085.4 dated Nov. 22, 2019.

Partial Supplementary European Search Report for 18747814.4 dated Jan. 30, 2020.

(56) References Cited

OTHER PUBLICATIONS

Office Action for Chinese Patent Application No. ;201780067964.X dated Apr. 23, 2021, 2 pages.
Office Action for Chinese Patent Application No. 201780069987.4 dated Apr. 23, 2021, 2 pages.
DE102012214650, English Machine Translation, 14 pages.
CN101274326A, English Machine Translation, 11 pages.
CN103376612A, English Machine Translation, 16 pages.
CN103312948AA, English Machine Translation, 15 pages.
CN201223863y, English Machine Translation, 16 pages.
CN101063830A, English Machine Translation, 29 pages.
CN201579230U, English Machine Translation, 11 pages.
Office Action in U.S. Appl. No. 16/883,165 dated Jul. 26, 2021.
CN Office Action dated Sep. 27, 2021.
T78189CN Office Action Translation dated Sep. 27, 2021.
Notice of Allowance received for U.S. Appl. No. 15/907,125 dated Apr. 26, 2022, 9 pages.
United States Patent and Trademark Office, office action for U.S. Appl. No. 17/165,895, dated Oct. 19, 2022, 8 pages.

\* cited by examiner

FROM FIG. 4A

A

414 — GENERATING SECOND SIGNAL HAVING SECOND FREQUENCY

416 — ACTIVATE ULTRASONIC TRANSDUCER USING SECOND SIGNAL

418 — REDUCE FLUID DROPLET AT CENTRAL AREA BY ATOMIZATION FROM SECOND SIZE TO THIRD SIZE

420 — ATTRACT ATOMIZED FLUID FROM CENTRAL AREA TO PERIPHERAL AREA

422 — COLLECT ATOMIZED FLUID AT PERIPHERAL AREA

424 — END CYCLE?

NO → B TO FIG. 4A

YES

426 — DEACTIVATE VOLTAGE BETWEEN ELECTRODE OF CENTRAL AREA AND ELECTRODE OF PERIPHERAL AREA

END

FIG. 4B

METHODS AND APPARATUS FOR ELECTROSTATIC CONTROL OF EXPELLED MATERIAL FOR LENS CLEANERS

RELATED APPLICATIONS

This application is related to copending U.S. patent applications, entitled "Methods and Apparatus Using Multistage Ultrasonic Lens Cleaning for Improved Water Removal" and "Methods and Apparatus for Ultrasonic Lens Cleaner Using Configurable Filter Banks", filed on the same day as the present application by Stephen John Fedigan and David Patrick Magee, the disclosure of which is incorporated by reference in its entirety.

FIELD OF THE DISCLOSURE

This disclosure relates generally to electrostatics and, more particularly, to methods and apparatus for electrostatic control of expelled material for lens cleaners.

BACKGROUND

It's an unfortunate occurrence, but the number of motor vehicle deaths appears to be increasing every year. There are a variety of reasons for this trend, including an increase in the driving population. Still, more engineering effort is needed to reduce risk of death or serious injury in automobiles. In addition to avoiding risks to drivers and passengers, more robust obstacle and collision avoidance systems are required to reduce the high cost of damage to automobiles and other property due to collisions.

Fortunately, new technologies are becoming available that manufacturers can incorporate into new automobiles at a reasonable cost. Some promising technologies that may help to improve obstacle and collision avoidance systems are digital camera based surround view and camera monitoring systems. In some cases, cameras can increase safety by being mounted in locations that can give drivers access to alternative perspectives, which is otherwise diminished or unavailable to the driver's usual view through windows or mirrors. While mounting one or more cameras for alternative views can provide many advantages, some challenges may remain.

SUMMARY

Mounting cameras for alternative views may expose optical surfaces associated with cameras to hazards such as fluid droplets (e.g., water droplets) that can interfere with visibility of such alternative views. In the described examples, methods and apparatus for electrostatic control of expelled material for lens cleaners are disclosed. In certain described examples, an apparatus can expel fluid by atomization from a central area of the surface using an ultrasonic transducer mechanically coupled to the surface. A first electrode can be arranged relative to the central area of the surface. A second electrode can be located in a peripheral area relative to the central area of the surface, in which a voltage can be applied between the first and second electrodes to attract atomized fluid at the peripheral area (e.g. towards the peripheral area).

In other described examples, a method to operate upon a fluid droplet received at the central area of the surface is disclosed. For example, a first signal including a first frequency can be generated. The ultrasonic transducer can be activated at the first frequency by coupling the first signal with the ultrasonic transducer. The fluid droplet can be reduced by atomization from a first droplet size to a second droplet size using the first frequency of the first signal. Further, a voltage can be applied between respective electrodes coupled with the central area of the surface and with a peripheral area.

BRIEF DESCRIPTION OF THE DRAWINGS

FIGS. 4A-4B show a flowchart representative of example machine readable instructions that may be executed to implement the example system to expel fluid from the droplet by atomization and to attract the atomized fluid using electrostatic control, according to an embodiment as shown in the example of FIG. 1.

DETAILED DESCRIPTION

Figure 1:
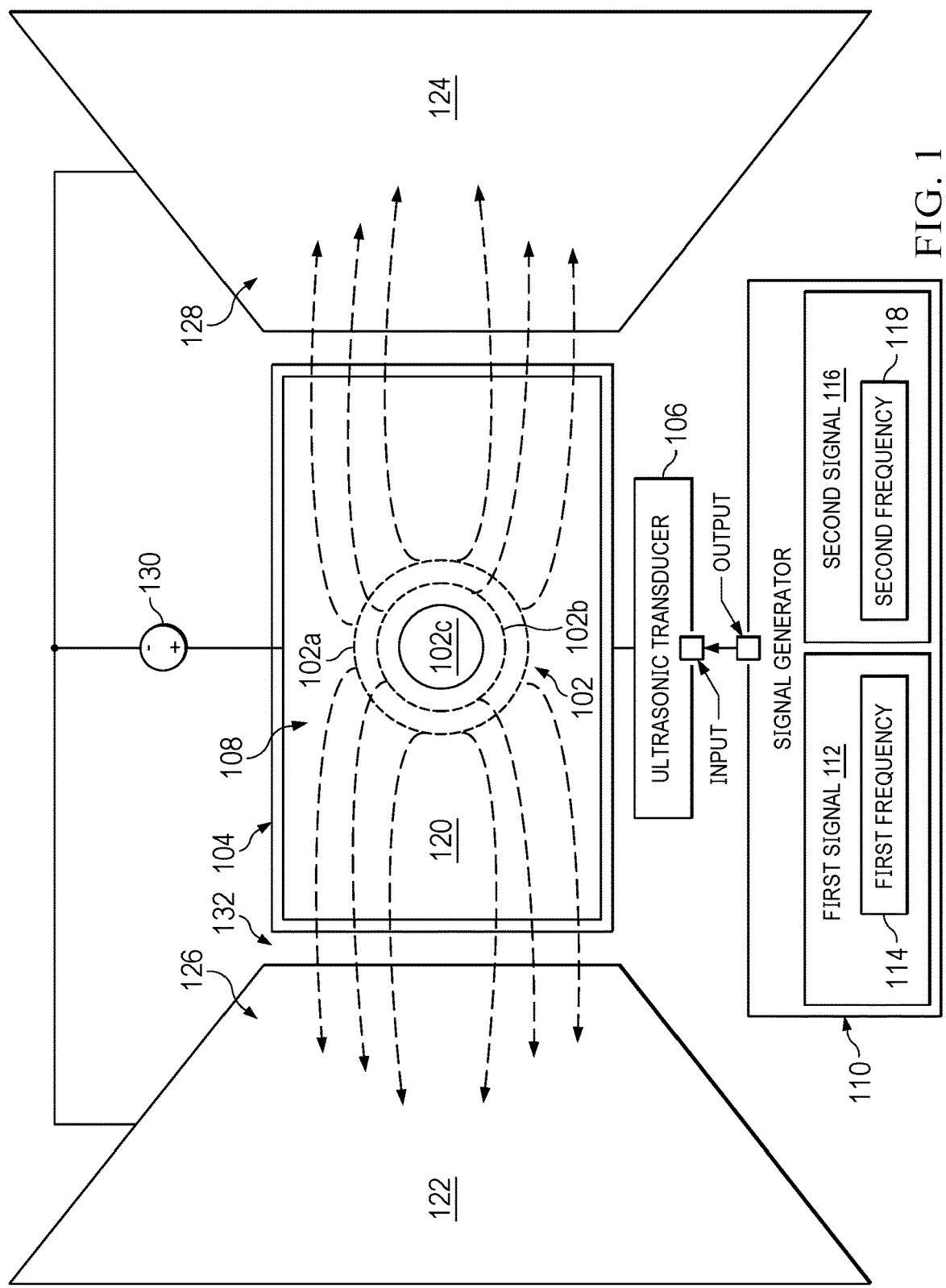
FIG. 1 is partial block diagram of a system according to an embodiment including an apparatus that can expel fluid by atomization and can attract the atomized fluid using electrostatic control from a central area of an optical surface.
Figure 2A:
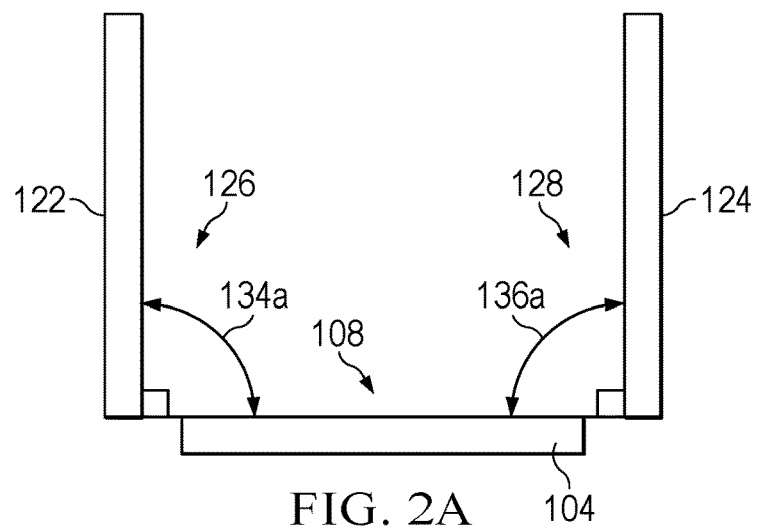
FIG. 2A is a plan view accordingly to an embodiment of areas shown in FIG.
Figure 2B:
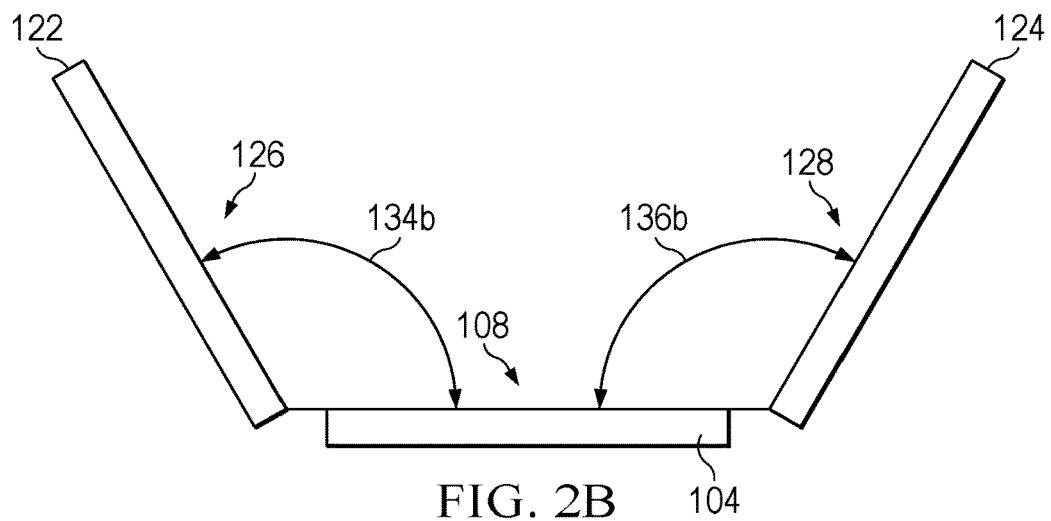
FIG. 2B is a plan view according to another embodiment of areas shown in FIG. 1.
Figure 2C:
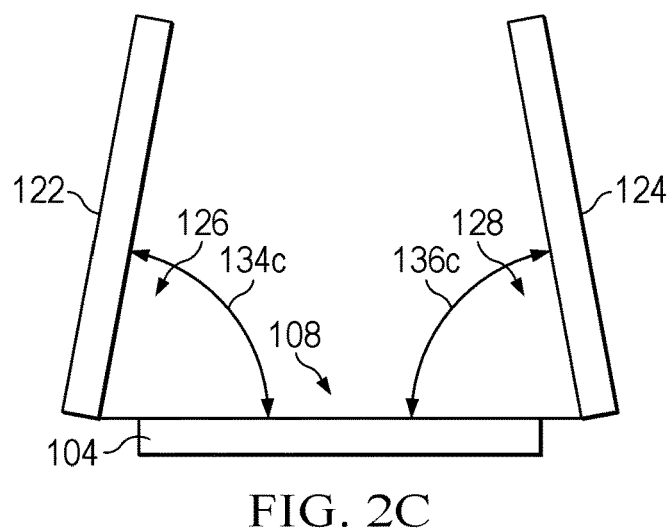
FIG. 2C is a plan view according to another embodiment of areas shown in FIG. 1.

FIG. 1 is partial block diagram of a system 100 that can expel fluid from a droplet 102 on an optical surface 104 using an ultrasonic transducer 106 mechanically coupled to the optical surface 104. The apparatus can expel fluid by atomization and then attract the atomized fluid from a central area 108 of the optical surface 104 using electrostatic control. For example, the ultrasonic transducer 106 can be a piezoelectric ultrasonic transducer 106 including a piezoelectric material (e.g., lead zirconate titanate PZT or niobium doped lead zirconate titanate PNZT.) Epoxy can be used for the mechanical coupling of the ultrasonic transducer 106 with the optical surface 104. The fluid droplet 102 can be disposed on the optical surface 104, and can be coupled with the ultrasonic transducer 106 through the optical surface 104. In the example of FIG. 1, the ultrasonic transducer 106 mechanically coupled to the optical surface 104 has first and second resonant frequency bands.

As shown in the example of FIG. 1, a signal generator 110 can generate a first signal 112 having a first frequency 114 to reduce the fluid droplet from a first size 102a to a second size 102b, and to generate a second signal 116 having a second frequency 118 to reduce the fluid droplet from the second size 102b to a third size 102c. In the drawings: the first droplet size 102a is representatively illustrated using a dash-dot-dot-dash line style; the second droplet size 102b is representatively illustrated using a dash-dot-dash line style; and the third droplet size 102c is representatively illustrated using solid line style.

The first frequency 114 to reduce the fluid droplet from the first size 102a to the second size 102b can be higher in frequency than the second frequency 118 to reduce the fluid droplet from the second size 102b to the third size 102c. The first frequency 114 of the first signal 112 is within the first resonant frequency band of the ultrasonic transducer 106 mechanically coupled to the optical surface 104. In some examples, the first frequency 114 of the first signal 112 can be a first sweep of frequencies (e.g., a first frequency sweep) within the first resonant frequency band of the ultrasonic transducer 106 mechanically coupled to the optical surface 104. The second frequency 118 of the second signal 116 is within the second resonant frequency band of the ultrasonic transducer 106 mechanically coupled to the optical surface 104. In some examples, the second frequency 118 of the second signal 116 can be a second sweep of frequencies (e.g., a second frequency sweep) within the second resonant frequency band of the ultrasonic transducer 106 mechanically coupled to the optical surface 104. The first frequency 114 of the first signal 112 can be different than the second frequency 118 of the second signal 116. The first frequency sweep can be different than the second frequency sweep. The first resonant frequency band can be different than the second resonant frequency band.

A first electrode 120 can be arranged relative to the central area of the optical surface 104. For example, the first electrode 120 can be proximately coupled with the central area of the optical surface 104. For example, the first electrode 120 can be arranged over and/or on the central area of the optical surface 104. For example, the first electrode 120 can be an electrode coating on the central area of the optical surface 104. The first electrode can be a transparent material, for example indium tin oxide.

Figure 3A:
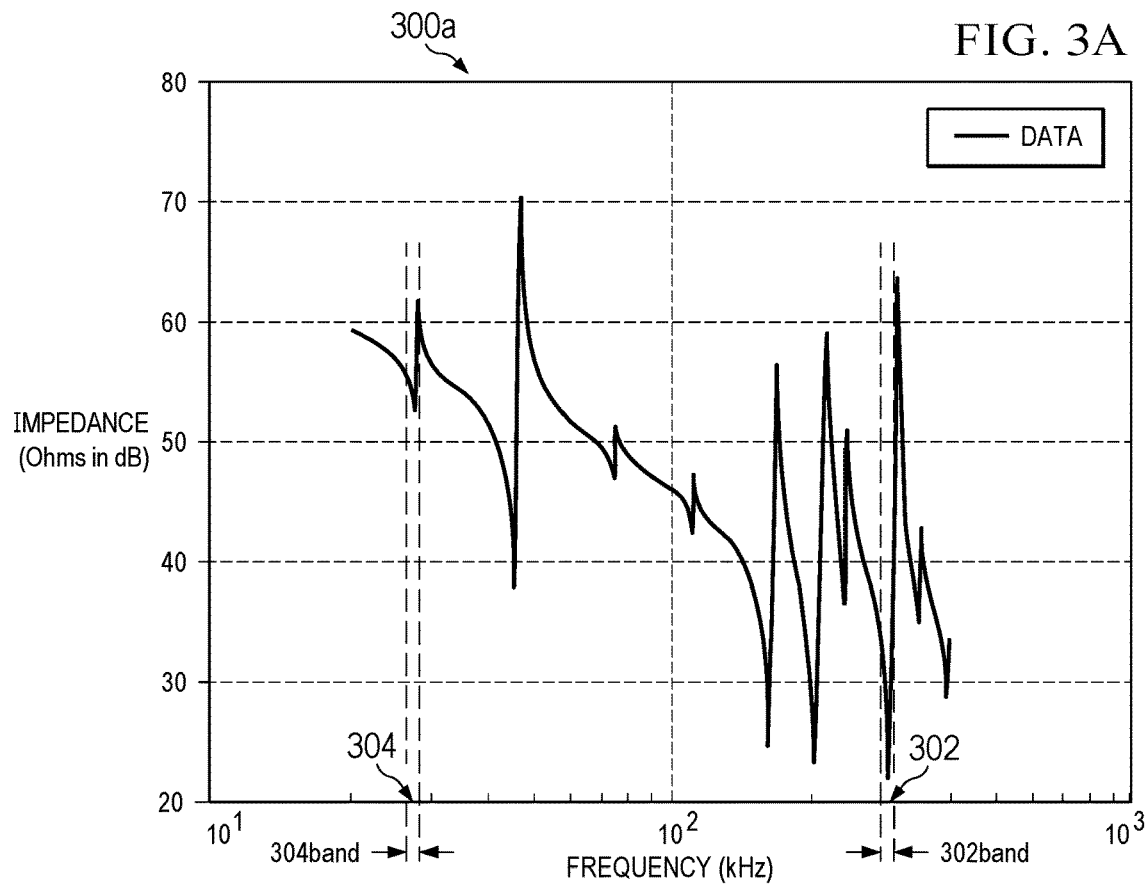
FIG. 3A is a diagram of impedance versus frequency for an example ultrasonic transducer mechanically coupled to an example optical surface according to an embodiment.

Second electrodes 122, 124 can be located in peripheral areas 126, 128 relative to the central area 108 of the optical surface 104. For example, second electrode 122 can be located in a peripheral area 126. Second additional electrode 124 can be located in an additional peripheral area 128. A voltage from a voltage source 130 (e.g., voltage generator 130) can be applied between the first electrode 120 and the second electrodes 122, 124 to attract atomized fluid at the peripheral areas 126, 128 (e.g., attract atomized fluid towards the peripheral areas 126, 128). In the example of FIG. 1, stippled arrows representatively illustrate atomization of the fluid from the central area 108 of the optical surface 104. The stippled arrows represent atomized fluid extending from the central area 108 of the optical surface 104 to peripheral areas 126, 128 of the second electrodes 122, 124. This figure illustrates electrostatic control, as the second electrodes 122, 124 attract atomized fluid at the peripheral areas 126, 128 (e.g., attract atomized fluid towards the peripheral areas 126, 128).

Polarity of the voltage generator of 130 is illustrated in FIG. 1 using a "+" symbol for positive voltage polarity and a "−" symbol for negative voltage polarity. As shown in the example of FIG. 1, a positive polarity of the voltage can be applied to the first electrode 120, and a negative polarity of the voltage can be applied to the second electrodes 122, 124.

The central area 108 of the optical surface 104 can be hydrophobic. For example, the central area 108 of the optical surface 104 can be more hydrophobic than the peripheral areas 126, 128. The central area 108 of the optical surface 104 can include a hydrophobic coating. In other examples, the peripheral areas 126, 128 can likewise be hydrophobic (e.g., can include a hydrophobic coating).

As shown in the example of FIG. 1, a volume 132 adjacent to the central area 108 of the optical surface 104 can be at least partially enclosed by the peripheral areas 126, 128. FIG. 2A is a plan view accordingly to an embodiment of central area 108 and peripheral areas 126, 128 shown in FIG. 1. As shown in the example of FIG. 2A, an angle 134*a* between the central area 108 of the optical surface 104 and the peripheral area 126 can be a right angle. Similarly, an additional angle 136*a* between the central area 108 of the optical surface 104 and the additional peripheral area 128 can be a right angle. The right angle may provide a beneficial balance of various factors such as electric field strength and avoidance of blocking visibility of the optical surface 104.

FIG. 2B is a plan view according to another embodiment of central area 108 and peripheral areas 126, 128 shown in FIG. 1. As shown in the example of FIG. 2B, an angle 134*b* between the central area 108 of the optical surface 104 and the peripheral area 126 can be an obtuse angle. Similarly, an additional angle 136*b* between the central area 108 of the optical surface 104 and the additional peripheral area 128 can be an obtuse angle. The obtuse angle 134*b*, 136*b* may provide a benefit of a low profile of the peripheral areas 126, 128.

FIG. 2C is a plan view according to another embodiment of areas shown in FIG. 1. As shown in the example of FIG. 2C, an angle 134*c* between the central area 108 of the optical surface 104 and the peripheral area 126 can be an acute angle. Similarly, an additional angle 136*c* between the central area 108 of the optical surface 104 and the additional peripheral area 128 can be an acute angle. The acute angle 134*c*, 136*c* may provide a benefit of an enhanced electric field for electrostatic control.

FIG. 3A is a diagram 300*a* of impedance (Ohms in dB) versus frequency (logarithmic scale in kilohertz) for an example ultrasonic transducer mechanically coupled to an example optical surface according to an embodiment. FIG. 3A shows the example first frequency 302 of an example three-hundred kilohertz for the example ultrasonic transducer mechanically coupled to the example optical surface. The example first frequency 302 of the example three-hundred kilohertz can correspond to a first nominal resonance frequency of a first low impedance resonance extremity 302 in the diagram of FIG. 3A at the first frequency 302 of the example ultrasonic transducer mechanically coupled to the example optical surface. The example first frequency 302 of the example three-hundred kilohertz can correspond to the first nominal resonance frequency of the first low impedance resonance extremity 302 that is centered within a first resonance band "302band". More broadly, the first frequency 302 is within a first resonance band "302band". The first resonance band is defined herein as extending in frequency to plus and minus ten percent of the first nominal resonance frequency of the first low impedance resonance extremity for the ultrasonic transducer mechanically coupled to the optical surface. For example, with the example first frequency of the example three-hundred kilohertz, the first resonance band extends in frequency to plus and minus ten percent of the first nominal resonance frequency of three-hundred kilohertz (e.g. the first resonance band extends in frequency to plus and minus thirty kilohertz from the three-hundred kilohertz, or the first resonance band extends in frequency from two-hundred-and-seventy kilohertz to three-hundred-and-thirty kilohertz).

Further, FIG. 3A shows the example second frequency 304 of an example twenty-six kilohertz for the example ultrasonic transducer mechanically coupled to the example optical surface. The example second frequency 304 of the example twenty-six kilohertz corresponds to a second nominal resonance frequency of a second low impedance resonance extremity 304 in the diagram of FIG. 3A at the second frequency 304 of the example ultrasonic transducer mechanically coupled to the example optical surface. The example second frequency 304 of the example twenty-six kilohertz corresponds to the second nominal resonance frequency of the second low impedance resonance extremity 304 that is centered within a second resonance band "304band". More broadly, the second frequency 304 is within a second resonance band "304band". The second resonance band is defined herein as extending in frequency to plus and minus ten percent of the second nominal resonance frequency of the second low impedance resonance extremity for the ultrasonic transducer mechanically coupled to the optical surface. For example, with the example second frequency of the example twenty-six kilohertz, the second resonance band extends in frequency to plus and minus ten percent of the second nominal resonance frequency of twenty-six kilohertz (e.g. the second resonance band extends in frequency to plus and minus two and six-tenths kilohertz from the twenty-six kilohertz, or the second resonance band extends in frequency from twenty-three-and-four-tenths kilohertz to twenty-eight-and-six-tenths kilohertz).

Figure 3B:
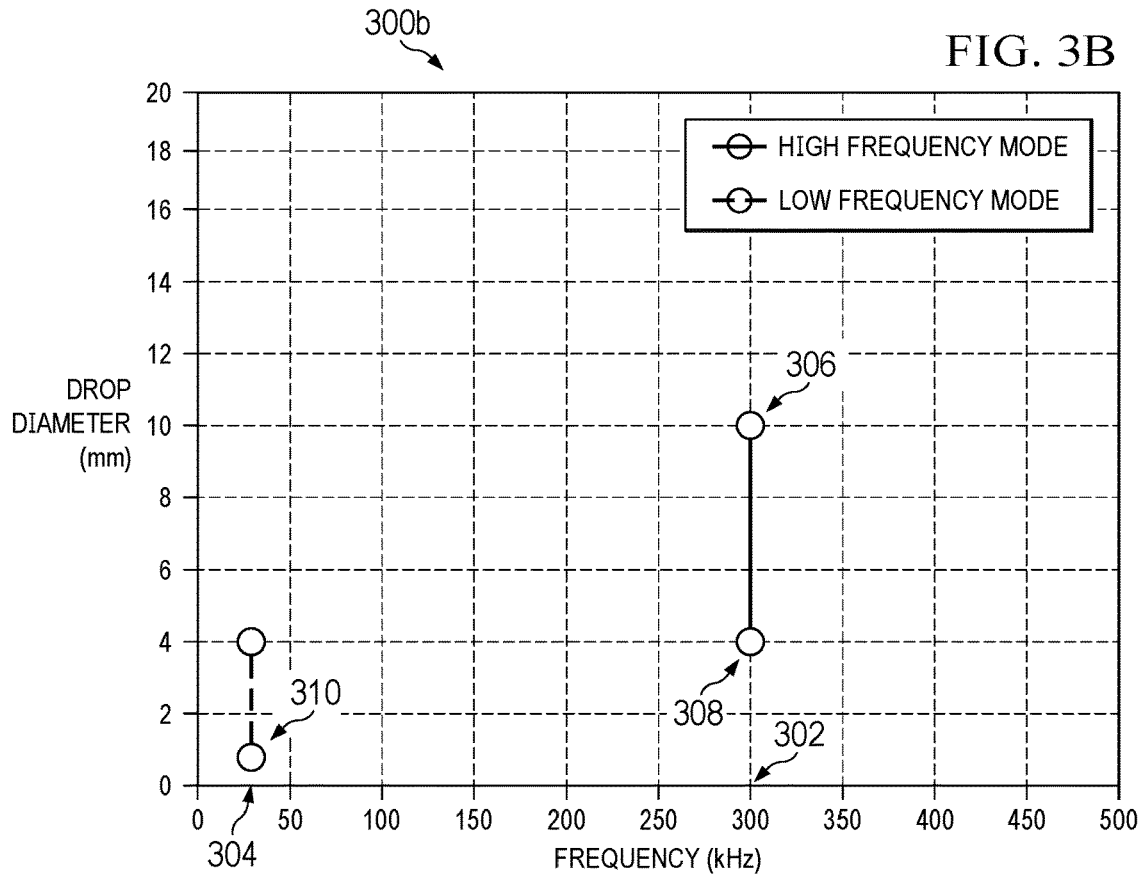
FIG. 3B is a diagram of example droplet size reduction versus frequency according to an embodiment.

FIG. 3B is a diagram 300*b* of example droplet size reduction versus frequency according to an embodiment. The example of FIG. 3B shows the example first frequency 302 of the example three-hundred kilohertz for the example ultrasonic transducer mechanically coupled to the example optical surface. As shown in the example of FIG. 3B, the example first frequency 302 of the example three-hundred kilohertz can reduce the droplet from the first droplet size 306 (e.g., reduce from ten millimeters in droplet diameter) to the second droplet size 308 (e.g., reduce to four millimeters in droplet diameter).

Further, the example of FIG. 3B shows the example second frequency 304 of the example twenty-six kilohertz for the example ultrasonic transducer mechanically coupled to the example optical surface. As shown in the example of FIG. 3B, the example second frequency 304 of the example twenty-six kilohertz can reduce the droplet from the second droplet size 308 (e.g., reduce from four millimeters in droplet diameter) to the third droplet size 310 (e.g., reduce to eight-tenths of a millimeter in droplet diameter).

While example manners of implementing the example system 100 for electrostatic control of expelling fluid from a droplet 102 from an optical surface 104 using the ultrasonic transducer 106 mechanically coupled to the optical surface 104 of FIG. 1, one or more of the elements, processes and/or devices illustrated in FIG. 1 may be combined, divided, re-arranged, omitted, eliminated and/or implemented in any other way.

Further, the example system 100, example optical surface 104, example ultrasonic transducer 106, example signal generator 110, example first signal 112, example first frequency 114, 302, example second signal 116, example second frequency 118, 304, example first electrode 120, example second electrode 122, example second additional electrode 124, example peripheral area 126, example additional peripheral area 128, example voltage source 130 and example volume 132 as shown in the example of FIG. 1 may be implemented by hardware, software, firmware and/or any combination of hardware, software and/or firmware, and may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further still, the example system 100, example optical surface 104, example ultrasonic transducer 106, example signal generator 110, example first signal 112, example first frequency 114, 302, example second signal 116, example second frequency 118, 304, example first electrode 120, example second electrode 122, example second additional electrode 124, example peripheral area 126, example additional peripheral area 128, example voltage source 130 and example volume 132 as shown in the example of FIG. 1 may include one or more elements, processes and/or devices in addition to, or instead of, those illustrated in FIG. 1, and/or may include more than one of any or all of the illustrated elements, processes and devices.

When reading any of the apparatus or system claims of this patent to cover a purely software and/or firmware implementation, at least one of the example system 100, example optical surface 104, example ultrasonic transducer 106, example signal generator 110, example first signal 112, example first frequency 114, 302, example second signal 116, example second frequency 118, 304, example first electrode 120, example second electrode 122, example second additional electrode 124, example peripheral area 126, example additional peripheral area 128, example voltage source 130 and example volume 132 as shown in the example of FIG. 1 is/are hereby expressly defined to include a tangible computer readable storage device or storage disk such as a memory, a digital versatile disk (DVD), a compact disk (CD), a Blu-ray disk, etc. storing the software and/or firmware.

Figure 4A:
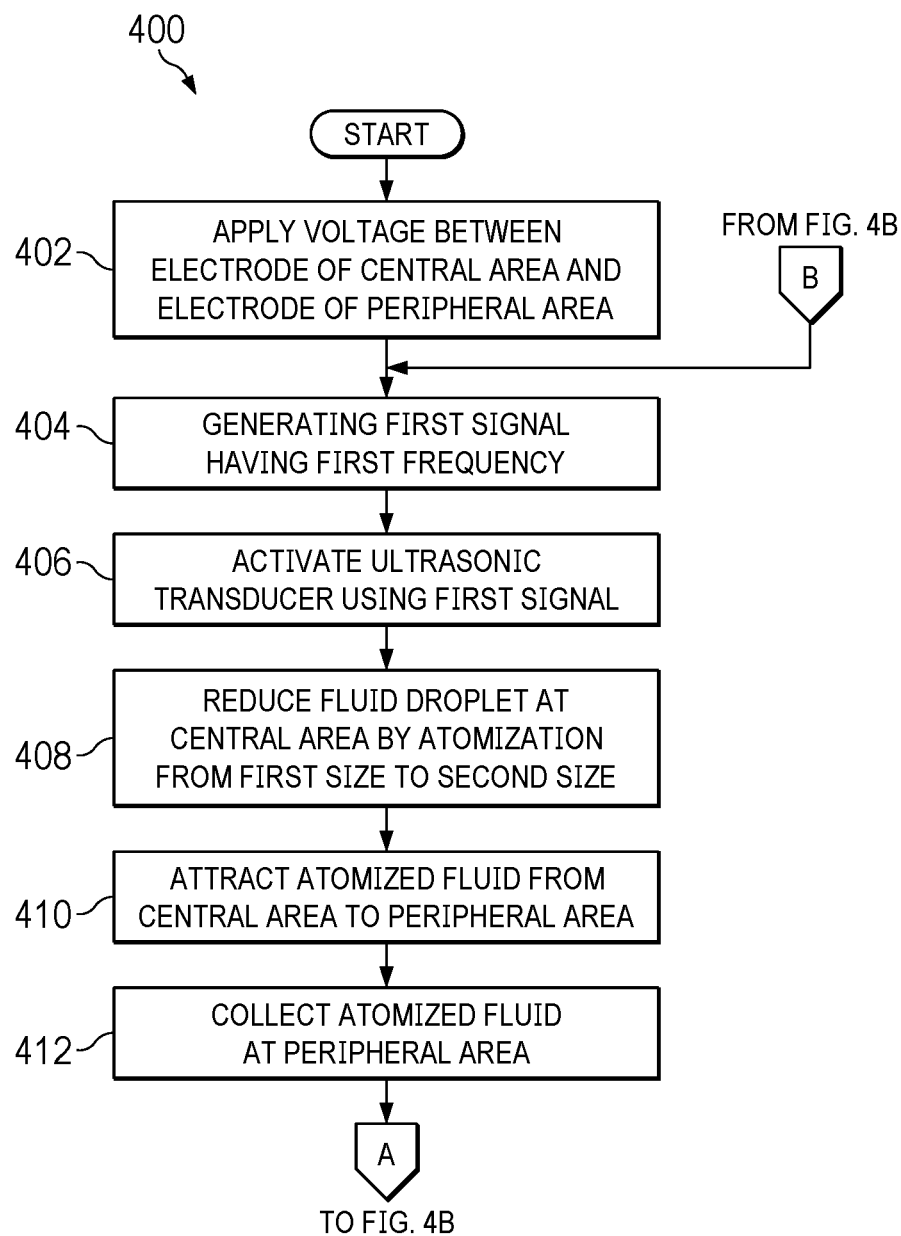

FIGS. 4A-4B show a flowchart representative of example machine readable instructions that may be executed to implement the example system 100 to expel fluid from the droplet 102 by atomization and attract the signal generator 110 fluid using electrostatic control, according to an embodiment as shown in the example of FIG. 1. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory (e.g., FLASH memory) associated with the processor 512, but the entire program and/or parts thereof could alternatively be executed by a device other than the processor 512 and/or embodied in firmware or dedicated hardware. Further, although the example program is described with reference to the flowchart illustrated in FIGS. 4A-4B, many other methods of implementing the example system 100 to expel fluid from the droplet 102 by atomization and attract the atomized fluid using electrostatic control may alternatively be used. For example, the order of execution of the blocks may be changed, and/or some of the blocks described may be changed, eliminated, or combined. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

As mentioned above, the example processes of FIGS. 4A-4B may be implemented using coded instructions (e.g., computer and/or machine readable instructions) stored on a tangible computer readable storage medium such as a hard disk drive, a FLASH memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 4A-4B may be implemented using coded instructions (e.g., computer and/or machine readable instructions) stored on a non-transitory computer and/or machine readable medium such as a hard disk drive, a FLASH memory, a read-only memory, a compact disk, a digital versatile disk (DVD), a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

A process flow 400 of FIGS. 4A-4B can begin at block 402. At block 402, a voltage can be applied between a first electrode arranged relative to the central area of the optical surface and a second electrode located in a peripheral area relative to the central area of the optical surface. As shown in the example of FIG. 1, a voltage from voltage source 130 (e.g., voltage generator 130) can be applied between a first electrode 120 arranged relative to the central area 108 of the optical surface 104 and second electrodes 122, 124 located in peripheral areas 126, 128 relative to the central area 108 of the optical surface 104.

Next, as shown in the example of FIG. 4A, at block 404 the first signal having the first frequency can be generated. For example, the signal generator 110 shown in the example of FIG. 1 can be used to generate the first signal 112 having the first frequency 114. As shown in the example of FIG. 1, the signal generator 110 can be coupled with the ultrasonic transducer 106. The ultrasonic transducer 106 can be mechanically coupled to the optical surface 104.

Next, as shown in the example of FIG. 4A, at block 406 the ultrasonic transducer can be activated using the first signal. As shown in the example of FIG. 1, the signal generator 110 can be coupled with the ultrasonic transducer 106 to activate the ultrasonic transducer 106 using the first signal 112. The first frequency 114 of the first signal 112 can be within the first resonant frequency band of the ultrasonic transducer 106 mechanically coupled to the optical surface 104.

Next, as shown in the example of FIG. 4A, at block 408 a fluid droplet at a central area of the optical surface can be reduced by atomization from a first size to a second size using the first signal having the first frequency. As shown in the example of FIG. 1, fluid droplet 102 at a central area 108 of the optical surface 104 can be reduced by atomization from a first size 102a to a second size 102b using the first signal 112 having the first frequency 114.

Next, as shown in the example of FIG. 4A, at block 410 the applied voltage can attract the atomized fluid (e.g., fluid atomized by the first signal) from the central area to the peripheral area. Next, at block 412 the atomized fluid (e.g., fluid atomized by the first signal) can be collected at the peripheral area. As shown in the example of FIG. 1, stippled arrows representatively illustrate atomization of the fluid from the central area 108 of the optical surface 104. The stippled arrows represent atomized fluid extending from the central area 108 of the optical surface 104 to peripheral areas 126, 128 of the second electrodes 122, 124. This figure illustrates the applied voltage attracting the atomized fluid (e.g., fluid atomized by the first signal) from the central area 108 to be collected at the peripheral areas 126, 128.

Next, as shown in the example of FIG. 4B, at block 414, the second signal having the second frequency can be generated. Next, at block 416 the ultrasonic transducer can be activated using the second signal. The second frequency of the second signal can be within a second resonant frequency band of the ultrasonic transducer mechanically coupled to the optical surface. The second frequency of the second signal can be different than the first frequency of the first signal. The second resonant frequency band can be different than the first resonant frequency band.

Next, at block 418 the fluid droplet at the central area of the optical surface can be reduced by atomization from the second size to a third size using the second signal having the second frequency. As shown in the example of FIG. 1, fluid droplet 102 at the central area 108 of the optical surface 104 can be reduced by atomization from the second size 102b to a third size 102c using the second signal 116 having the second frequency 118.

Next, at block 420 the applied voltage can attract the atomized fluid (e.g., fluid atomized by the second signal) from the central area to the peripheral area. Next, at block 422 the atomized fluid (e.g., fluid atomized by the second signal) can be collected at the peripheral area. As shown in the example of FIG. 1, stippled arrows representing the atomized fluid (e.g., fluid atomized by the second signal) extend from the central area 108 of the optical surface 104 to peripheral areas 126, 128 of the second electrodes 122, 124. This illustrates the applied voltage attracting the atomized fluid (e.g., fluid atomized by the second signal) from the central area 108 to be collected at the peripheral areas 126, 128.

Next, at decision block 424 it is determined whether to end the cycle of expelling fluid from the optical surface. For example, if a control input registered at a time determines that the cycle is not to end at that time, then flow execution transfers to block 404 shown in FIG. 4A. However, if a control input registered at that time determines that the cycle is to end at that time, then flow execution can go to block 426 to deactivate electrodes. At block 426, voltage can be deactivated between the first electrode arranged relative to the central area of the optical surface and the second electrode located in the peripheral area relative to the central area of the optical surface. As shown in the example of FIG. 1, the voltage from voltage source 130 (e.g., voltage generator 130) can be deactivated between the first electrode 120 arranged relative to the central area 108 of the optical surface 104 and second electrodes 122, 124 located in peripheral areas 126, 128 relative to the central area 108 of the optical surface 104. After block 426, the example method 400 can end.

Figure 5:
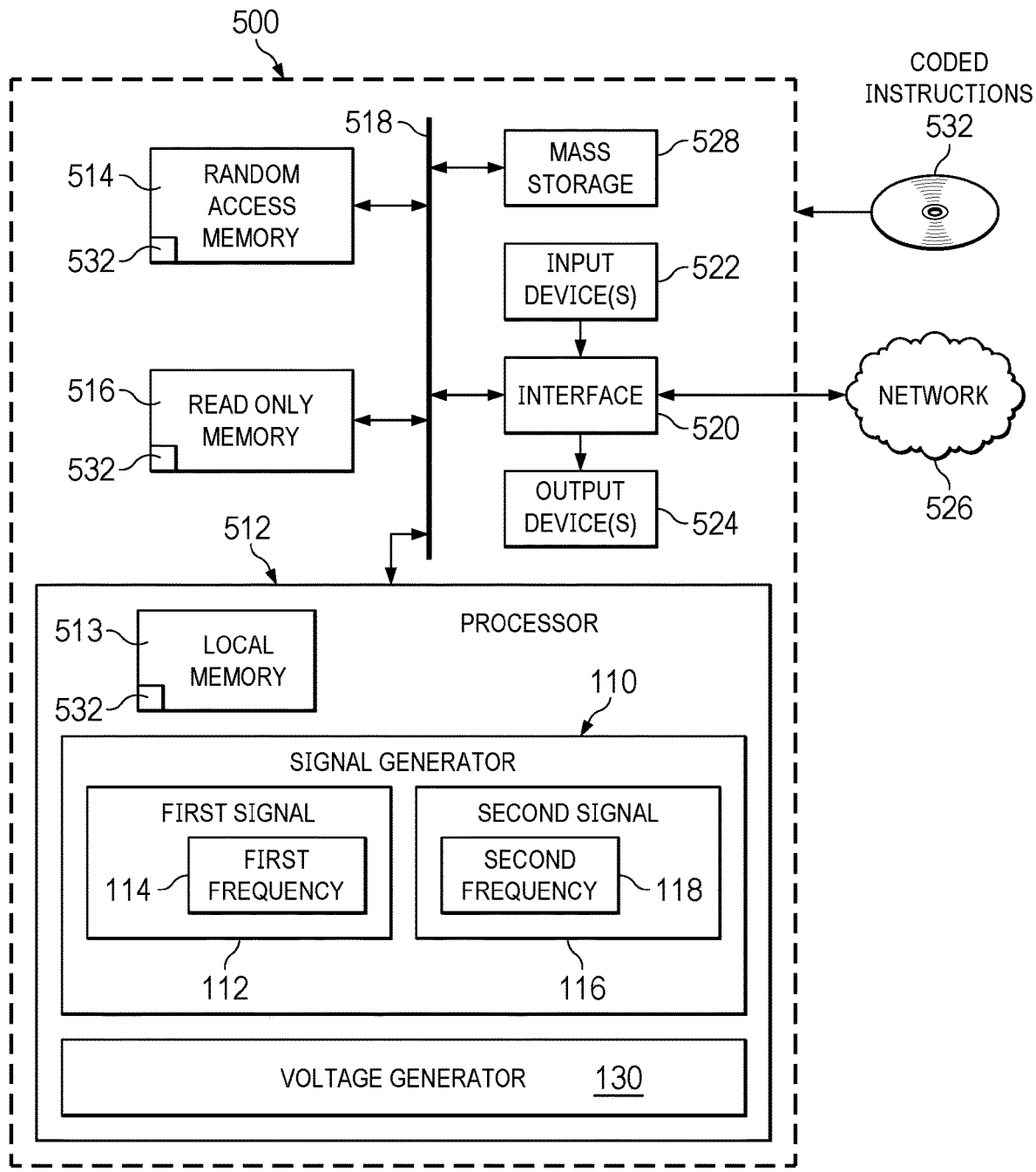
FIG. 5 is a block diagram of an example processing platform capable of executing the machine readable instructions of FIGS. 4A-4B to implement the example system to expel fluid from the droplet by atomization and to attract the atomized fluid using electrostatic control, according to an embodiment as shown in the example of FIG. 1.

FIG. 5 is a block diagram of an example processing platform capable of executing the machine readable instructions of FIGS. 4A-4B to implement the example system to expel fluid from the droplet by atomization and to attract the atomized fluid using electrostatic control, according to an embodiment as shown in the example of FIG. 1.

The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware of processor 512 can be virtualized using virtualization such as Virtual Machines and/or containers. The processor 512 can implement example voltage source 130 (e.g., voltage generator 130) and can implement example signal generator 110, including example first signal 112, example first frequency 114, example second signal 116, and example second frequency 118 using methods such as pulse-width modulation (PWM) or direct digital synthesis (DDS).

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by FLASH memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk (CD) drives, Blu-ray disk drives, RAID systems, and digital versatile disk (DVD) drives.

The coded instructions 532 of FIG. 5 may be stored in the mass storage device 528, in the volatile memory 514, in the non-volatile memory 516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an optical surface;
   an ultrasonic transducer mechanically coupled to the optical surface, the ultrasonic transducer having an input, and the ultrasonic transducer configured to atomize a fluid on the optical surface by vibrating the optical surface responsive to a signal received at the input;
   a first signal generator having an output coupled to the input;
   a first electrode having a first surface facing the optical surface; and
   a second electrode having a second surface in a peripheral area outside the optical surface, wherein the second surface is angled relative to the optical surface, and the second electrode is configured to move the atomized fluid away from the optical surface by generating an electric field between the first and second electrodes; and
   a second signal generator coupled between the first and second electrodes.

2. The apparatus of claim 1, wherein the optical surface is hydrophobic.

3. The apparatus of claim 1, wherein the peripheral area is hydrophobic.

4. The apparatus of claim 1, wherein the optical surface is at least partially enclosed by the peripheral area.

5. The apparatus of claim 1, wherein an angle between the optical surface and the second electrode is a right angle.

6. The apparatus of claim 1, wherein an angle between the optical surface and the second electrode is an obtuse angle.

7. The apparatus of claim 1, wherein an angle between the optical surface and the second electrode is an acute angle.

8. The apparatus of claim 1, wherein the signal is a first signal;
   wherein the first signal generator is configured to generate the first signal having a first frequency and a second signal having a second frequency; and
   wherein the ultrasonic transducer has first and second resonant frequency bands, the first frequency is within the first resonant frequency band, and the second frequency is within the second resonant frequency band.

9. The apparatus of claim 8, wherein the ultrasonic transducer is configured to reduce a droplet of the fluid from a first size to a second size by vibrating the optical surface at the first frequency responsive to the first signal, and to reduce the droplet from the second size to a third size by vibrating the optical surface at the second frequency responsive to the second signal.

10. The apparatus of claim 9, wherein the first frequency is higher than the second frequency.

11. The apparatus of claim 1, wherein the first surface of the first electrode is attached onto the optical surface.

12. The apparatus of claim 11, wherein the first electrode comprises an electrode coating on the optical surface.

13. The apparatus of claim 1, wherein the first surface forms an angle with the second surface.

14. The apparatus of claim 1, wherein the second electrode is configured to attract the atomized fluid away from the optical surface towards the peripheral area, by using the electric field to electrostatically control the atomized fluid responsive to a voltage between the first and second electrodes provided by the second signal generator, in which the first electrode is configured to receive a first polarity of the voltage, the second electrode is configured to receive a second polarity of the voltage, and the second polarity is opposite the first polarity.

15. The apparatus of claim 14, wherein the first polarity is a positive polarity, and the second polarity is a negative polarity.

16. The apparatus of claim 1, wherein the second signal generator includes a voltage generator.

17. An apparatus comprising:
   an optical surface that is hydrophobic;
   an ultrasonic transducer mechanically coupled to the optical surface, the ultrasonic transducer having an input, and the ultrasonic transducer configured to atomize a fluid on the optical surface by vibrating the optical surface responsive to a signal received at the input;
   a first signal generator having an output coupled to the input;
   a first electrode having a first surface facing the optical surface;
   a second electrode having a second surface in a peripheral area that at least partially encloses the optical surface, wherein an angle between the optical surface and the second surface is a right angle, an obtuse angle or an acute angle, and the second electrode is configured to move the atomized fluid away from the optical surface by generating an electric field between the first and second electrodes; and
   a second signal generator coupled between the first and second electrodes.

18. The apparatus of claim 17, wherein the peripheral area is hydrophobic.

19. The apparatus of claim 17, wherein the signal is a first signal;
   wherein the first signal generator is configured to generate the first signal having a first frequency and a second signal having a second frequency; and
   wherein the ultrasonic transducer has first and second resonant frequency bands, the first frequency is within the first resonant frequency band, and the second frequency is within the second resonant frequency band.

20. The apparatus of claim 19, wherein the ultrasonic transducer is configured to reduce a droplet of the fluid from a first size to a second size by vibrating the optical surface at the first frequency responsive to the first signal, and to reduce the droplet from the second size to a third size by vibrating the optical surface at the second frequency responsive to the second signal.

21. The apparatus of claim 20, wherein the first frequency is higher than the second frequency.

22. The apparatus of claim 17, wherein the second electrode is configured to attract the atomized fluid from the optical surface towards the peripheral area, by using the electric field to electrostatically control the atomized fluid responsive to a voltage between the first and second electrodes provided by the second signal generator, in which the first electrode is configured to receive a first polarity of the voltage, the second electrode is configured to receive a second polarity of the voltage, and the second polarity is opposite the first polarity.

23. The apparatus of claim 22, wherein the first polarity is a positive polarity, and the second polarity is a negative polarity.

* * * * *